United States Patent [19]

Wang

[11] Patent Number: 5,266,420
[45] Date of Patent: Nov. 30, 1993

[54] ADAPTER FUNNEL FOR ELECTROLYTE FEEDER OF A BATTERY

[76] Inventor: Juei-Liu Wang, No. 12, Lane 114, Nan Kung St., Yung Kang Hsiang, Tainan Hsien, Taiwan

[21] Appl. No.: 4,095

[22] Filed: Jan. 13, 1993

[51] Int. Cl.⁵ .............................................. H01M 2/36
[52] U.S. Cl. ........................................ 429/72; 429/80
[58] Field of Search ............................ 429/63, 72, 80; 141/331, 332, 237, 241; 221/302; 222/460, 462, 129

[56] References Cited

U.S. PATENT DOCUMENTS

| | | | |
|---|---|---|---|
| 4,565,750 | 1/1986 | Jsoi et al. | 429/72 |
| 4,833,047 | 5/1989 | Jsoi et al. | 429/72 |
| 5,209,990 | 5/1993 | Wang et al. | 429/63 |

*Primary Examiner*—Anthony Skapars
*Attorney, Agent, or Firm*—Hedman, Gibson & Costigan

[57] ABSTRACT

An adapter funnel for an electrolyte feeder of a battery includes a plurality of adjacent connected chambers, each of which has an upper tube having an acute head at the top thereof and a lower tube fixed therein. The lower tube having a diameter less than that of the upper tube thus limiting the rate of flow of the electrolyte from the electrolyte feeder through the upper tube, the lower tube, and to the battery.

6 Claims, 5 Drawing Sheets

ADAPTER FUNNEL FOR ELECTROLYTE FEEDER OF A BATTERY

FIELD OF THE INVENTION

The present invention relates to an adapter funnel for an electrolyte feeder of a battery especially for a battery having plural cells.

BACKGROUND OF THE INVENTION

U.S. patent application No. 759,238 filed Sept. 13, 1991, now U.S. Pat. No. 5,208 990 which belongs to the inventor of the present invention, was allowed on Oct. 26, 1992 disclosing a battery assembly (see FIG. 1) having a battery case 1 and a electrolyte feeder 2 such that the electrolyte can be fed into the battery case 1 directly from the electrolyte feeder 2. The electrolyte feeder 2 has a plurality of vessels 20 connected to each other, each of which has a neck portion 21 and a bottom 22 as shown. Normally, the bottom 22 is made of thin film for easy piercing/puncturing. The battery case 1 has a plurality of cells (not labeled) therein, each cell having a socket opening 10 at the top thereof for accommodating a neck portion 21 of a corresponding vessel 20 and a central post 11 installed therein for piercing the bottom 22 of each vessel 20 and enabling the electrolyte therein to fill each cell of the battery case 1. The above battery assembly is easy to use and operates well. However, some other battery cases (not shown) lacking the central post 11 cannot cooperate with the electrolyte feeder 2, thus limiting the acceptability of the electrolyte feeder 2. It is necessary for the inventor to invent an adapter funnel for mating between the above electrolyte feeder 2 and the non-central-post battery case, thus enabling the electrolyte feeder 2 to be used for a battery case with/without central posts 11. More over, to manufacture a battery case 1 with central posts 11 therein is more difficult than one without central posts 11. Therefore, the adapter funnel has its practical requirement.

SUMMARY OF THE INVENTION

An object of the present invention is to provide an adapter funnel for an electrolyte feeder of a battery assembly which does not contain a central post therein for piercing the bottom of the electrolyte feeder.

These and additional objects, if not set forth specifically herein, will be readily apparent to those skilled in the art from the detailed description provided hereunder, with appropriate reference to the accompanying drawings.

DETAIL DESCRIPTION OF THE INVENTION

Figure 1:
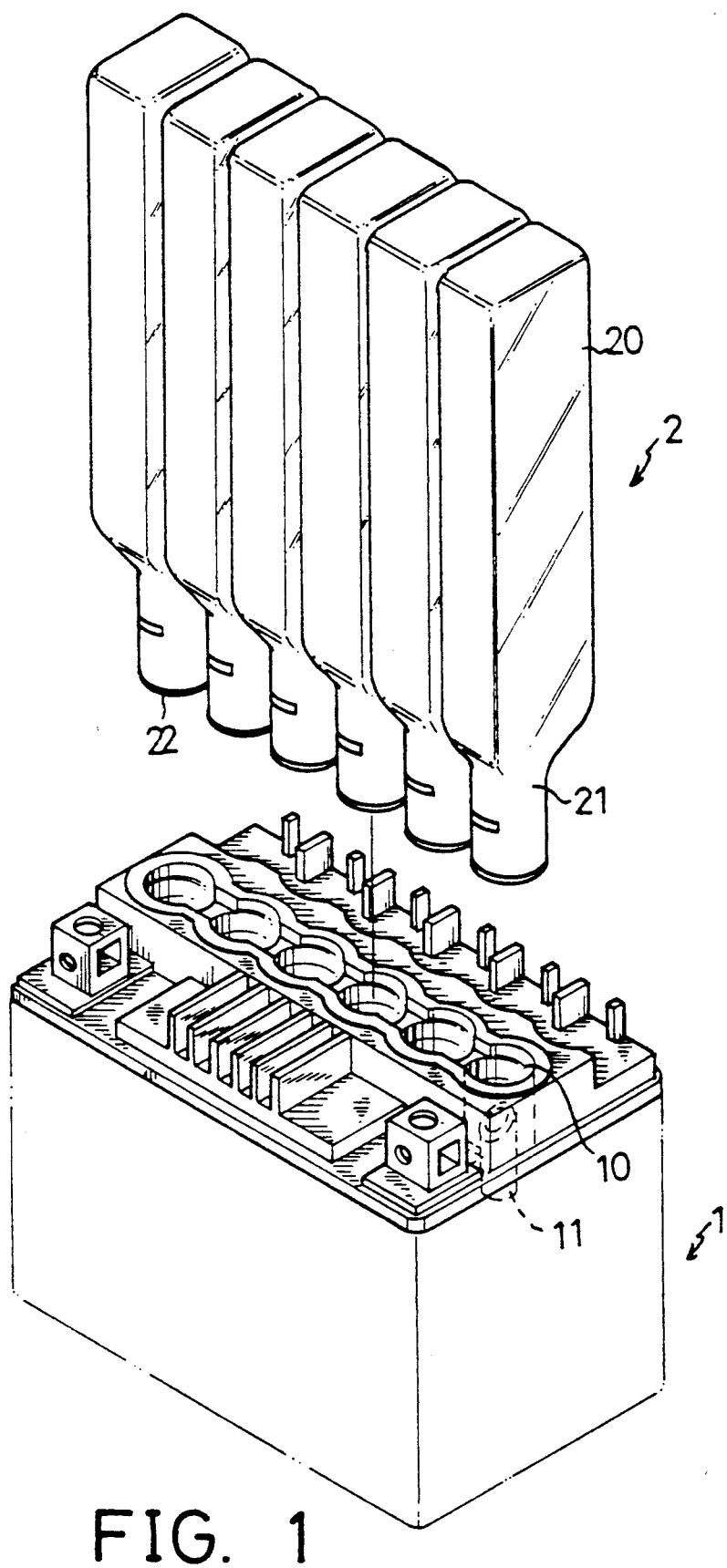
FIG. 1 is a conventional battery assembly comprising an electrolyte feeder and a battery case having central posts for piercing the bottom of the electrolyte feeder.
Figure 2:
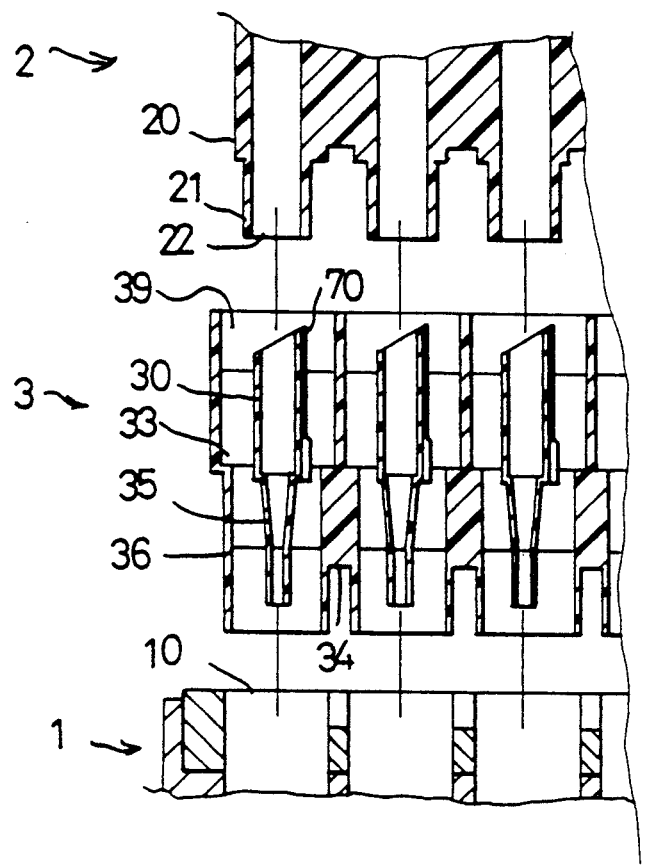
FIG. 2 is a sectional view illustrating an adapter funnel mating between an electrolyte feeder and a battery case lacking a central post.
Figure 3:
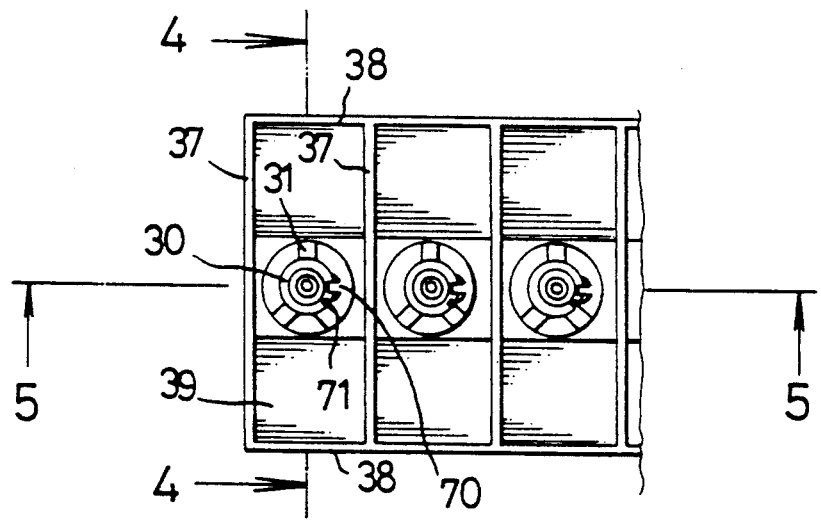
FIG. 3 is a partial top plan view of an adapter funnel in accordance with the present invention.
Figure 4:
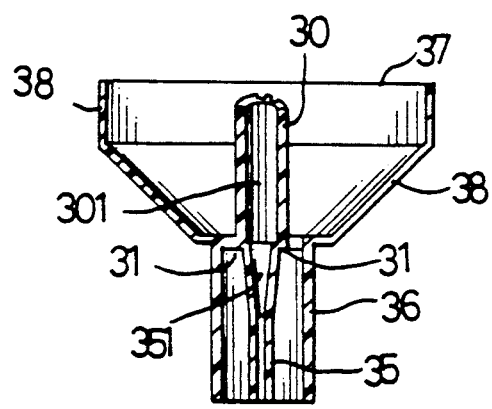
FIG. 4 is a sectional view of the adapter funnel of FIG. 3 taken from line 4—4.
Figure 5:
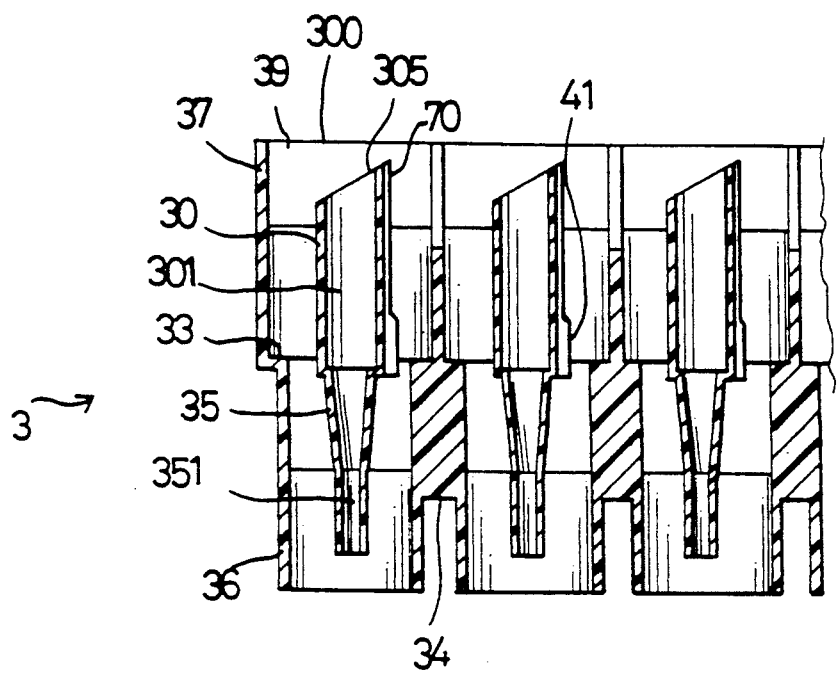
FIG. 5 is a partial sectional view of the adapter funnel of FIG. 3 taken from line 5—5.

Referring to FIGS. 3 to 5, an adapter funnel 3 of the present invention is shown in different points of views for more detail. The adapter funnel 3 comprises a plurality of chambers 39 each of which has a rectangular opening 300 at the top thereof, a pair of parallel walls 37, a pair of tapering walls 38, and a rectangular bottom 33. The parallel walls 37 and the tapering walls 38 are connected to four sides of the rectangular bottom 33, thus forming one of the chamber 39. Each chamber 39 is adjacent to each other by interconnecting with a parallel wall 37. An outer tube 36 extending downward from the bottom 33 of each chamber 39 is in communication with the rectangular opening 300. Three arms 31 extending from the inner wall of the outer tube 36 are interconnected to an upper tube 30 near the bottom 33 of the chamber 39. The interconnection of the three arms 31 and the upper tube 30 constitutes a relatively strong and constant structure thereof. The upper tube 30 is located inside a corresponding chamber 39. A first channel 301 is formed inside the upper tube 30 and down to a bottom 302 thereof. A lower tube 35 extending from the bottom 302 of the upper tube 30 has a second channel 351 therein for communicating with the first channel 301. The second channel 351 has a diameter less than that of the first channel 301 for limiting the flowing rate of electrolyte from the upper tube 30 through the lower tube 351 to the battery case 1 as will be described in detail later. FIG. 2 illustrates a spatial relation between a conventional electrolyte feeder 2, the adapter funnel 3, and a conventional battery case 1. Since the simple structures of the conventional electrolyte feeder 2 and the battery case 1 have been introduced previously, it is not repeated herein. Particularly referring to FIGS. 2 and 5, a strengthening portion 34 is formed between two adjacent outer tubes 36 for strengthening the adapter funnel 3 when it receives external pressure as will be described in detail later. An acute head 305 is formed at the top of the upper tube 30 for easy piercing the bottom 22 of the electrolyte feeder 2. An elongate air groove 70 is formed along the longitudinal periphery of the upper tube 30 from the acute head portion 305 to the bottom 302 thereof allowing external air to replace the electrolyte in the feeder (2) when the upper tube (30) pierces the bottom (22) of the feeder (2). A notched portion 71 is formed at the acute head 305 near the air groove 70 for easily piercing the bottom 22 of the electrolyte feeder 2.

Figure 7:
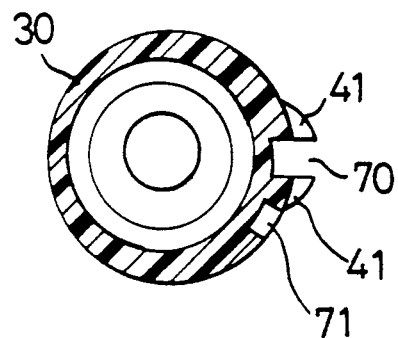
FIG. 7 is a top view of the central post of FIG. 3.

Referring to FIG. 7, a pair of ribs 41 are formed on a lower periphery portion of the upper tube 30 at each side of the elongate air groove 70 for preventing the fragment of the bottom 22 from entering the air groove 70 when the upper tube 30 pierces the bottom 22 of the electrolyte feeder 2.

Figure 6:
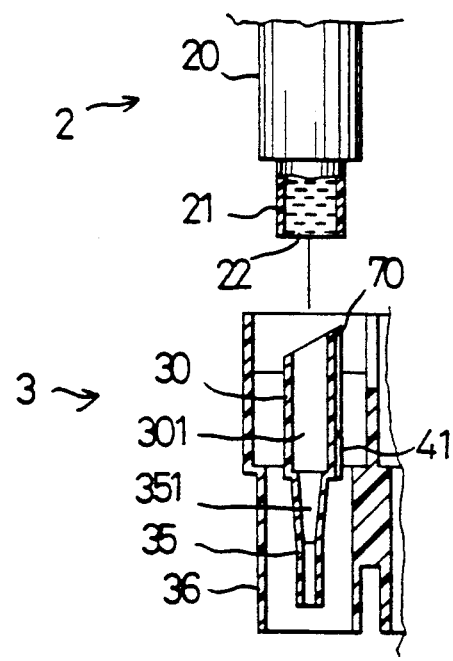
FIG. 6 is a schematically sectional view illustrating the bottom of an electrolyte feeder is to be pierced by a central post of the adapter funnel of the present invention.
Figure 8:
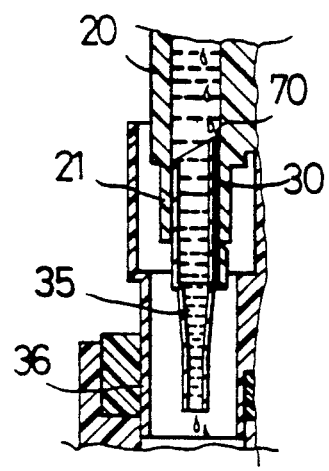
FIG. 8 is a schematically sectional view illustrating the bottom of an electrolyte feeder having been pierced by a central post of the adapter funnel of the present invention.

Referring to FIG. 6, the electrolyte feeder 2 filled with electrolyte is to be pierced by the upper tube 30. Referring to FIG. 8, the upper tube 30 has already pierced the bottom 22 of the electrolyte feeder 2, thus the electrolyte therein is fed to the battery case 1 via the upper tube 30 and the lower tube 35. Since the diameter of the lower tube 35 is less than the upper tube 30, the flowing rate of the electrolyte is limited.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An adapter funnel for an electrolyte feeder of a battery having a battery case (1), comprising a plurality of chambers (39) each of which has a rectangular opening (300) at the top thereof, a pair of parallel walls (37), a pair of tapering walls (38), and a rectangular bottom (33), said parallel walls (37) and said tapering walls (38) being connected to four sides of said rectangular bottom (33); each chamber (39) being adjacent to each other by interconnecting with said parallel wall (37); an outer tube (36) extending downward from the bottom (33) of said chamber (39) being in communication with said rectangular opening (300); an upper tube (30) having a plurality of arms (31) extending from a relatively lower periphery thereof and connecting to inner periphery of said outer tube (36) being located inside said chamber (39); a first channel (301) formed inside said upper tube (30) and down to a bottom (302) thereof; a lower tube (35) extending from said bottom (302) of said upper tube (30) having a second channel (351) therein for communicating with said first channel (301); said second channel (351) having a diameter less than that of said first channel (301) for limiting the flowing rate of any electrolyte from said upper tube (30) through said lower tube (35) to said battery case (1).

2. The adapter funnel as claimed in claim 1, wherein said upper tube (30) has an acute head (305) for easy piercing said bottom (22) of said electrolyte feeder (2).

3. The adapter funnel as claimed in claim 2, wherein said upper tube (30) has an air groove (70) formed on the longitudinal periphery thereof from said acute head (305) to a bottom end thereof allowing external air to replace the electrolyte in said feeder (2) when said upper tube (30) pierces said bottom (22) of said feeder (2).

4. The adapter funnel as claimed in claim 3, wherein said upper tube (30) has a notched portion (71) formed at said acute head (305) near said air groove (70) for easily piercing said bottom (22) of said electrolyte feeder (2).

5. The adapter funnel as claimed in claim 3, wherein said upper tube (30) has a pair of ribs (41) formed on a lower periphery portion thereof just at each side of said air groove (70) for preventing fragments of said bottom (22) from entering said air groove (70) when said upper tube (30) pierces said bottom (22) of said electrolyte feeder (2).

6. The adapter funnel as claimed in claim 1, wherein a strengthening portion (34) is formed between said two adjacent outer tubes (36) for strengthening said adapter funnel.

* * * * *